United States Patent
Zhang et al.

(10) Patent No.: US 9,705,577 B2
(45) Date of Patent: Jul. 11, 2017

(54) METHOD FOR SELECTING PRECODING MATRIX INDICATION, APPARATUS AND SYSTEM

(71) Applicant: Huawei Technologies Co., Ltd., Shenzhen (CN)

(72) Inventors: Huawei Zhang, Lagos (NG); Jinlin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/046,192

(22) Filed: Feb. 17, 2016

(65) Prior Publication Data

US 2016/0164583 A1    Jun. 9, 2016

Related U.S. Application Data

(63) Continuation of application No. PCT/CN2013/081938, filed on Aug. 21, 2013.

(51) Int. Cl.
*H04B 7/04* (2017.01)
*H04B 7/0456* (2017.01)
*H04B 7/06* (2006.01)

(52) U.S. Cl.
CPC ......... *H04B 7/0456* (2013.01); *H04B 7/0617* (2013.01); *H04B 7/0639* (2013.01)

(58) Field of Classification Search
CPC ... H04B 7/0456; H04B 7/0639; H04B 7/0617
See application file for complete search history.

(56) References Cited

U.S. PATENT DOCUMENTS

| 7,804,800 | B2 * | 9/2010 | Li | H04B 7/0447 370/334 |
| 9,209,881 | B2 * | 12/2015 | Srinivasa | H04B 7/0434 |
| 2008/0310405 | A1 | 12/2008 | Cox et al. | |
| 2010/0002598 | A1 * | 1/2010 | Pan | H04B 7/063 370/252 |
| 2011/0310818 | A1 * | 12/2011 | Lin | H04W 72/042 370/329 |
| 2011/0317748 | A1 | 12/2011 | Li et al. | |
| 2012/0120997 | A1 | 5/2012 | Park et al. | |

(Continued)

FOREIGN PATENT DOCUMENTS

| CN | 101505205 A | 8/2009 |
| CN | 101686214 A | 3/2010 |

(Continued)

*Primary Examiner* — Kenneth Lam
(74) *Attorney, Agent, or Firm* — Slater Matsil, LLP

(57) ABSTRACT

Embodiments of the present invent provide a method for selecting a pre-coding matrix indication, an apparatus and a system. In embodiments the method includes sending, by a base station, indication information to a terminal, wherein the indication information is used to instruct the terminal to send uplink data without weighting the uplink data or after weighting the uplink data by using an identity matrix and receiving, by the base station, the uplink data sent by the terminal. The method further includes selecting, by the base station, a first pre-coding matrix indication (PMI) from a pre-coding matrix indication set of the base station according to the uplink data and sending the first PMI to the terminal.

16 Claims, 7 Drawing Sheets

(56) References Cited

U.S. PATENT DOCUMENTS

| | | | |
|---|---|---|---|
| 2012/0219042 A1* | 8/2012 | Onggosanusi | H04B 7/0456 375/219 |
| 2012/0230274 A1* | 9/2012 | Xiao | H04B 7/024 370/329 |
| 2012/0252474 A1* | 10/2012 | Tiirola | H04L 5/0048 455/450 |
| 2012/0320819 A1* | 12/2012 | Kim | H04B 7/0417 370/315 |
| 2013/0034066 A1* | 2/2013 | Kakishima | H04L 27/2613 370/329 |
| 2013/0182671 A1* | 7/2013 | Kakishima | H04B 7/0417 370/329 |
| 2013/0251058 A1* | 9/2013 | Wu | H04B 7/0456 375/267 |
| 2015/0003338 A1* | 1/2015 | Xue | H04B 7/0452 370/329 |

FOREIGN PATENT DOCUMENTS

| | | |
|---|---|---|
| CN | 101783700 A | 7/2010 |
| CN | 101938336 A | 1/2011 |
| CN | 102833033 A | 12/2012 |
| CN | 102932114 A | 2/2013 |
| EP | 2608437 A1 | 6/2013 |

* cited by examiner

METHOD FOR SELECTING PRECODING MATRIX INDICATION, APPARATUS AND SYSTEM

This application is a continuation of International Application No. PCT/CN2013/081938, filed on Aug. 21, 2013, which is hereby incorporated by reference in its entirety.

TECHNICAL FIELD

The present invention relates to the communications field, and in particular, to a method for selecting a pre-coding matrix indication, an apparatus and a system.

BACKGROUND

Transmission performance of uplink SU-MIMO (single user multiple-input multiple-output) transmission may be improved by selecting a proper pre-coding matrix indication (PMI).

A base station receives a sounding signal periodically sent by a terminal. After receiving the sounding signal, the base station uses a pilot signal to parse the sounding signal to obtain a channel response, performs data processing on the obtained channel response according to a PMI selection criterion to select a proper PMI from a set of candidate PMIs, and delivers the selected PMI to the terminal through a physical downlink control channel (PDCCH).

In the process of implementing the foregoing solution, the prior art has at least the following problems:

In the prior art, the PMI selection is performed based on sounding measurement. Such issues as whether a terminal supports sending of a sounding signal, a sounding measurement period, or frequency band resources affect accuracy of the PMI selection, and thereby affecting performance gain of SU-MIMO.

SUMMARY

Embodiments of the present invent provide a method for selecting a pre-coding matrix indication, an apparatus and a system, which are used to solve a problem in the prior art where the PMI selection is inaccurate and this inaccuracy causes deterioration of system performance.

A first aspect provides a method for selecting a pre-coding matrix indication, including sending, by a base station, indication information to a terminal, where the indication information is used to instruct the terminal to send uplink data without weighting the uplink data or after weighting the uplink data by using an identity matrix, receiving the uplink data sent by the terminal, selecting a first pre-coding matrix indication (PMI) from a PMI set of the base station according to the uplink data, and sending the first PMI to the terminal.

In a first possible implementation manner of the first aspect, the indication information is a second PMI, where the second PMI is a PMI corresponding to an identity matrix codebook in the PMI set of the base station; the uplink data is uplink data that is weighted according to an identity matrix codebook corresponding to the second PMI and sent by the terminal.

With reference to the first aspect or the first possible implementation manner of the first aspect, in a second possible implementation manner, the sending, by a base station, indication information to a terminal includes: sending the indication information to the terminal non-periodically.

With reference to the second possible implementation manner of the first aspect, in a third possible implementation manner, the sending the indication information to the terminal non-periodically includes: sending the indication information to the terminal at time of a demodulation reference signal.

With reference to the first aspect or the first possible implementation manner of the first aspect, in a fourth possible implementation manner, the sending, by a base station, indication information to a terminal includes: sending the indication information to the terminal periodically.

With reference to the fourth possible implementation manner of the first aspect, in a fifth possible implementation manner, a sending period of the indication information is shorter than a sending period of a sounding signal of the terminal.

A second aspect provides a method for selecting a pre-coding matrix indication, including receiving, by a terminal, indication information sent by a base station, sending, according to the indication information, unweighted uplink data or uplink data weighted by using an identity matrix to the base station, and receiving a first pre-coding matrix indication (PMI) sent by the base station, where the first PMI is selected by the base station from a PMI set of the base station according to the uplink data sent by the terminal.

In a first possible implementation manner of the second aspect, the indication information is a second PMI, where the second PMI is a PMI corresponding to an identity matrix codebook in the PMI set of the base station, the sending, according to the indication information, unweighted uplink data or uplink data weighted by using an identity matrix to the base station includes: selecting an identity matrix codebook corresponding to the second PMI according to the second PMI, using the identity matrix codebook corresponding to the second PMI to weight uplink data, and sending the weighted uplink data to the base station.

With reference to the second aspect or the first possible implementation manner of the second aspect, in a second possible implementation manner, the indication information is sent by the base station at time of a demodulation reference signal.

With reference to the second aspect or the first possible implementation manner of the second aspect, in a third possible implementation manner, the indication information is sent by the base station periodically.

With reference to the third possible implementation manner of the second aspect, in a fourth possible implementation manner, a sending period of the indication information is shorter than a sending period of a sounding signal of the terminal.

A third aspect provides a base station including a sending unit configured to send indication information to a terminal, where the indication information is used to instruct the terminal to send uplink data without weighting the uplink data or after weighting the uplink data by using an identity matrix and a receiving unit configured to receive the uplink data sent by the terminal. The base station further includes a selecting unit configured to select a first PMI from a pre-coding matrix indication (PMI) set of the base station according to the uplink data received by the receiving unit, where the sending unit is further configured to send the first PMI selected by the selecting unit to the terminal.

In a first possible implementation manner of the third aspect, the indication information sent by the sending unit is a second PMI, where the second PMI is a PMI corresponding to an identity matrix codebook in the PMI set of the base station and where the uplink data received by the receiving unit is uplink data that is weighted according to an identity matrix codebook corresponding to the second PMI and sent by the terminal.

With reference to the third aspect or the first possible implementation manner of the third aspect, in a second possible implementation manner, the sending unit is specifically configured to send the indication information to the terminal non-periodically.

With reference to the second possible implementation manner of the third aspect, in a third possible implementation manner, the sending unit is specifically configured to send the indication information to the terminal at time of a demodulation reference signal.

With reference to the third aspect or the first possible implementation manner of the third aspect, in a fourth possible implementation manner, the sending unit is specifically configured to send the indication information to the terminal periodically.

With reference to the fourth possible implementation manner of the third aspect, in a fifth possible implementation manner of the third aspect, a sending period of the indication information is shorter than a sending period of a sounding signal of the terminal.

A fourth aspect provides a terminal including a receiving unit configured to receive indication information sent by a base station and a processing unit configured to obtain, according to the indication information received by the receiving unit, unweighted uplink data or uplink data weighted by using an identity matrix. The terminal further comprises a sending unit, configured to send the uplink data obtained by the processing unit to the base station, where the receiving unit is further configured to receive a first pre-coding matrix indication (PMI) sent by the base station, where the first PMI is selected by the base station from a PMI set of the base station according to the uplink data sent by the sending unit.

In a first possible implementation manner of the fourth aspect, the indication information received by the receiving unit is a second PMI, where the second PMI is a PMI corresponding to an identity matrix codebook in the PMI set of the base station; the processing unit is specifically configured to select an identity matrix codebook corresponding to the second PMI according to the second PMI and use the identity matrix codebook corresponding to the second PMI to weight uplink data and obtain the uplink data weighted by using the identity matrix.

With reference to the fourth aspect or the first possible implementation manner of the fourth aspect, in a second possible implementation manner, the indication information is sent by the base station at time of a demodulation reference signal.

With reference to the fourth aspect or the first possible implementation manner of the fourth aspect, in a third possible implementation manner, the indication information is sent by the base station periodically.

With reference to the third possible implementation manner of the fourth aspect, in a fourth possible implementation manner, a sending period of the indication information is shorter than a sending period of a sounding signal of the terminal.

According to a fifth aspect, the present invention provides a computer program product which includes an non-transitory computer-readable medium, where the computer-readable medium includes a group of program code configured to execute the method according to the first aspect or any one possible implementation manner of the first aspect.

According to a sixth aspect, the present invention provides a computer program product which includes a no-transitory computer-readable medium, where the computer-readable medium includes a group of program code configured to execute the method according to the second aspect or any one possible implementation manner of the second aspect.

For the method for selecting a pre-coding matrix indication, the apparatus and the system provided by the embodiments of the present invention, a base station sends identity matrix indication information to a terminal; the terminal sends, according to the identity matrix indication information, uplink data after weighting the data by using an identity matrix or without weighting the data; the base station selects a first PMI from a PMI set of the base station according to the received uplink data and delivers the first PMI to the terminal; the terminal uses the first PMI to perform data transmission. Compared with the prior art, the base station can initiate PMI selection actively when needed, without relying on a sounding signal sent by the terminal, so as to improve accuracy of the PMI selection and further increase performance gain of SU-MIMO.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Currently, PMI selection is performed based on sounding measurement. Such issues as whether a terminal supports sending of a sounding signal, a sounding measurement period, or frequency band resources affect accuracy of the PMI selection, and thereby affecting performance gain of SU-MIMO. In view of this, the following embodiments provide a method for selecting a PMI without relying on a sounding signal, in which a base station can initiate the PMI selection actively when needed, without relying on a sounding signal sent by a terminal, so as to improve the accuracy of the PMI selection and further increase the performance gain of the SU-MIMO.

For example, the base station may instruct the terminal to send uplink data after weighting the uplink data by using an identity matrix or without weighting the uplink data, which is equivalent to sending of the uplink data over a channel weighted by using the identity matrix or an unweighted channel. Then, no codebook information (a codebook other than the identity matrix codebook) that affects PMI measurement is introduced into the channel. Therefore, the base station may select a proper PMI according to a channel response obtained then and deliver the PMI to the terminal.

The following describes the foregoing process in detail with reference to the accompanying drawings and embodiments, and some details described below are intended to make a person skilled in the art understand the technical solutions, advantages and effects of the embodiments of the present invention more clearly, rather than to limit the present invention. In addition, the method for selecting a PMI according to the embodiments of the present invention may be used in combination with an existing PMI selection method based on sounding measurement, which is not limited in the embodiments of the present invention.

Figure 1:
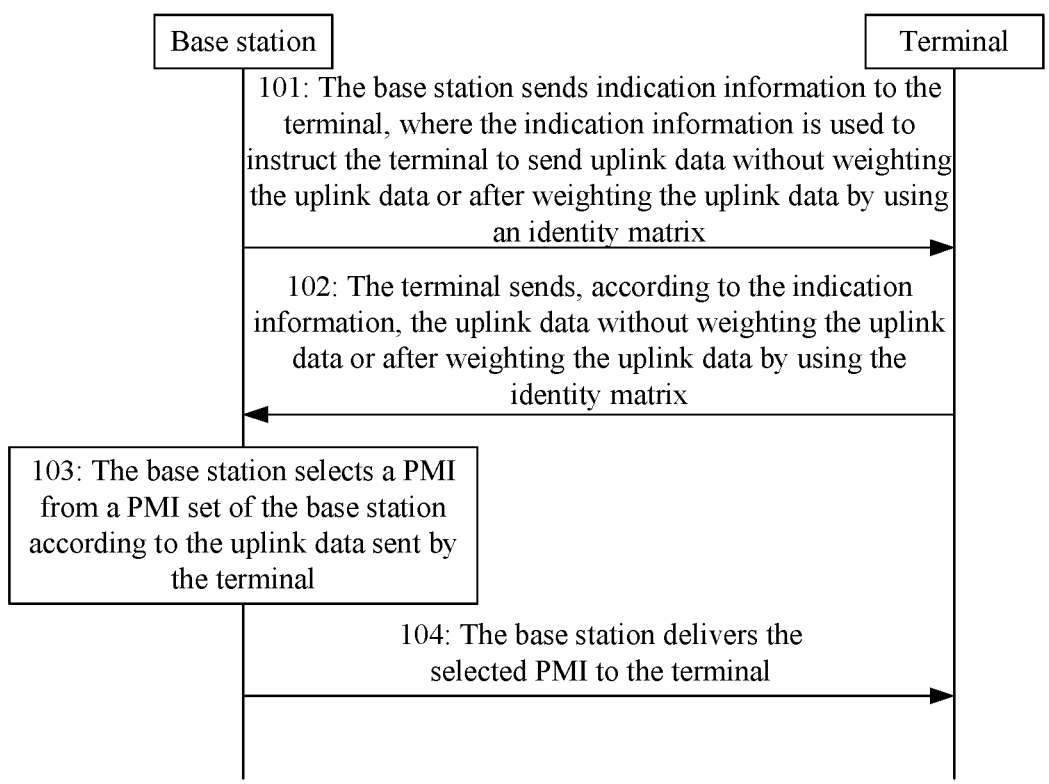
FIG. 1 is a signaling diagram of a method for selecting a PMI according to an embodiment of the present invention.

Refer to FIG. 1, which is a signaling diagram of a method for selecting a PMI according to an embodiment of the present invention. As shown in FIG. 1, the method includes the following steps:

Step 101: A base station sends indication information to a terminal, where the indication information is used to instruct the terminal to send uplink data without weighting the uplink data or after weighting the uplink data by using an identity matrix.

Step 102: The terminal sends, according to the foregoing indication information, the uplink data without weighting the uplink data or after weighting the uplink data by using the identity matrix.

Step 103: The base station selects a PMI from a PMI set of the base station according to the uplink data sent by the terminal.

Step 104: The base station delivers the selected PMI to the terminal.

In the foregoing embodiment, the base station can deliver the indication information to the terminal when needed to actively initiate PMI selection without relying on a sounding signal sent by the terminal, so as to improve accuracy of the PMI selection and further increase performance gain of SU-MIMO. Because the uplink data is sent after being weighted by using the identity matrix or without being weighted, no codebook information (a codebook other than the identity matrix codebook) that affects PMI measurement is introduced to a channel. Therefore, the base station may select a proper PMI according to a channel response obtained then and deliver the selected PMI to the terminal, so that the terminal can send uplink data after weighting the uplink data by using a more accurate PMI, thereby increasing the performance gain of the SU-MIMO.

In the step 101, the base station may send the indication information in a periodical or non-periodical sending manner.

For example, in the non-periodical sending manner, the indication information may be sent to the terminal at time of a demodulation reference signal (hereinafter referred to as a DMRS moment).

In the prior art, during every measurement period of the sounding signal, a channel is not weighted by using a PMI codebook; however, at the DMRS moment, the channel has been weighted by using a PMI codebook, that is, the channel then contains codebook information, and a base station cannot perform PMI measurement for the channel that contains the codebook information. Therefore, at the DMRS moment, if the solution in the prior art is still used, the base station cannot use the channel at the DMRS moment to perform PMI selection. In contrast, at the DMRS moment, using the method according to the foregoing embodiment can effectively solve the problem where the PMI selection cannot be performed at the DMRS moment.

In addition, channel quality may further be taken into consideration, so as to select a moment at which the channel quality is relatively good to trigger the foregoing PMI selection process and send the indication information. For example, it is determined, according to measurement by a terminal, whether a signal to noise ratio meets a preset condition, for example, whether the signal to noise ratio is greater than a certain threshold. Of course, this is only one exemplary policy and is not intended to limit the present invention; a person skilled in the art may select another policy as required as a moment for the base station to actively initiate the PMI selection.

For another example, in the periodical sending manner, a sending period of the indication information may be shorter than a sending period of the sounding signal of the terminal.

In the prior art, the accuracy of the PMI selection is affected by the sounding measurement period. The longer a preset measurement period, the longer a measurement interval is and the less accurate the PMI selection is. The accuracy of the PMI selection can be further improved by setting the sending period of the indication information to a value that is less than the sounding measurement period. Certainly, taking energy consumption on a terminal side into consideration, it is also inappropriate to set the sending period of the indication information to a value that is too short; a person skilled in the art may set the sending period of the indication information as required.

In addition, the sending period of the indication information may not be limited by the length of the sounding measurement period as well, for example, when a terminal does not support sending of a sounding signal; or, this manner may be used in combination with the existing PMI selection method based on sounding measurement, or used in combination with the non-periodically sending manner, or the like. No limitation is imposed by this embodiment of the present invention.

In the step 103, the selecting of the PMI by the base station is a technology well known to a person skilled in the art and is not detailed herein. A detailed description is given hereinafter by using an optimal system performance goal criterion as an example in an embodiment, which, however, is not intended to limit the present invention and is not an improvement of the present invention. A person skilled in the art may use any one technology in the prior art or later-developed PMI selection algorithm to perform the selection.

Figure 2:
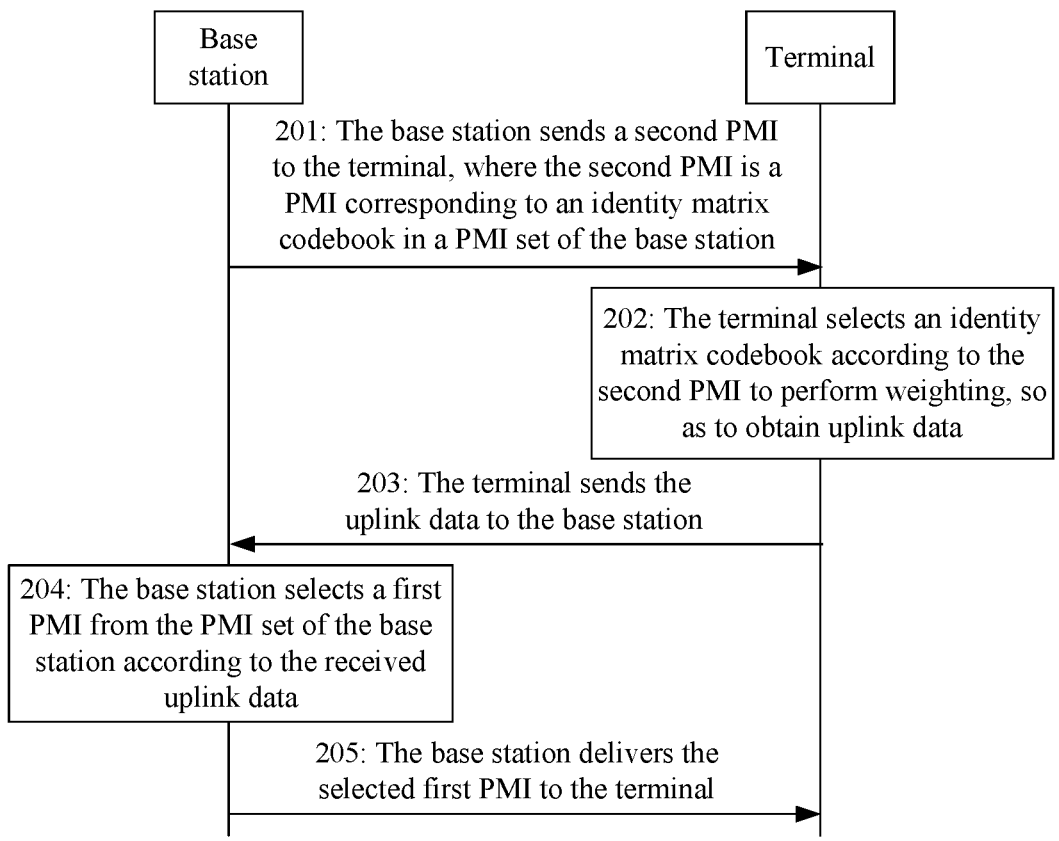
FIG. 2 is a signaling diagram of a method for selecting a PMI according to another embodiment of the present invention.

In addition, in the step 101, the indication information sent by the base station may be just an indication signaling used to instruct the terminal to send the uplink data after weighting the uplink data by using the identity matrix or without weighting the uplink data. In addition, the indication information sent by the base station may also be a PMI, where the PMI corresponds to an identity matrix codebook (namely, the identity matrix) in the PMI set of the base station and is used to instruct the terminal to send the uplink data after weighting the uplink data by using the identity matrix codebook corresponding to the PMI. In this case, in order to differentiate this PMI from the PMI selected in step 103, the PMI in step 103 is referred to as a first PMI, and the PMI sent in step 101 is referred to as a second PMI. Specifically, refer to FIG. 2, which is a signaling diagram of a method for selecting a PMI according to another embodiment of the present invention. As shown in FIG. 2, the method includes the following steps:

Step 201: A base station sends a second PMI to a terminal, where the second PMI is a PMI corresponding to an identity matrix codebook (simply referred to as an identity codebook) in a PMI set of the base station.

Step 202: The terminal selects an identity matrix codebook according to the second PMI to perform weighting, so as to obtain uplink data.

For example, if a matrix of a channel is H, the identity matrix codebook selected by the terminal according to the second PMI is I, and to-be-sent uplink data is X, then uplink data Y sent after being weighted is as follows:

$Y = I * H * X.$

Step 203: The terminal sends the uplink data to the base station.

Step 204: The base station selects a first PMI from the PMI set of the base station according to the received uplink data.

Step 205: The base station delivers the selected first PMI to the terminal.

Compared with the embodiment shown in FIG. 1, this embodiment is compatible with an existing protocol and achieves a purpose of improving accuracy of the PMI selection.

The second PMI is sent in the same manner as that described in the foregoing embodiment, which is not repeated herein.

Figure 3:
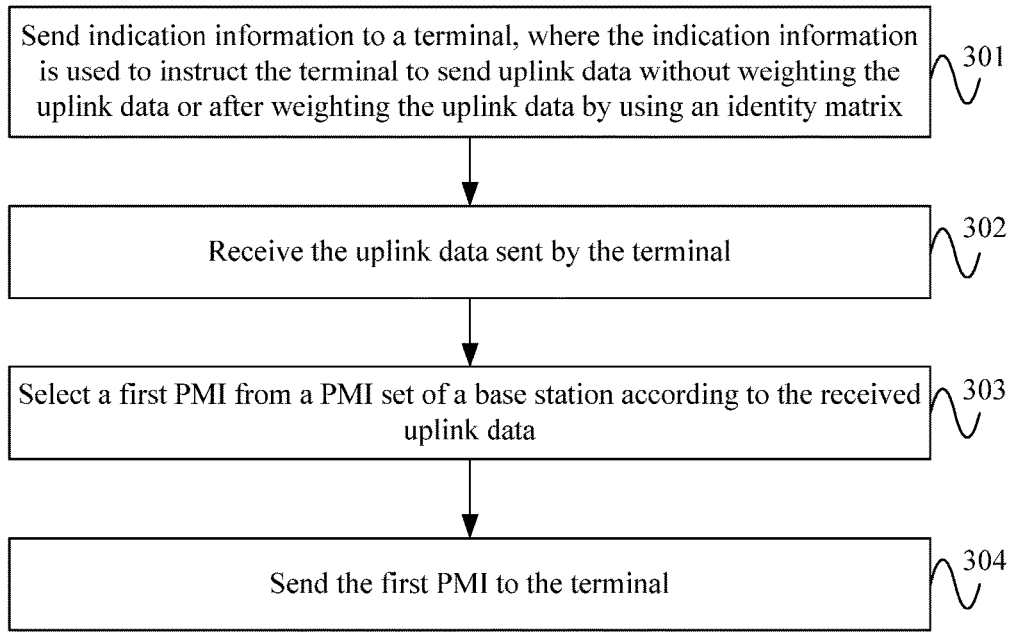
FIG. 3 is a flowchart of a method for selecting a PMI according to an embodiment of the present invention.

FIG. 3 is a flowchart of a method for selecting a PMI according to an embodiment of the present invention, which involves a base station side and includes the following steps:

Step 301: Send indication information to a terminal, where the indication information is used to instruct the terminal to send uplink data without weighting the uplink data or after weighting the uplink data by using an identity matrix.

A base station may send the indication information periodically or may send the indication information non-periodically. Specifically, this is the same as that described in the foregoing embodiment and not repeated herein.

Step 302: Receive the uplink data sent by the terminal.

Step 303: Select a first PMI from a PMI set of a base station according to the received uplink data.

Step 304: Send the first PMI to the terminal.

In respect of step 303, that is, a method for the base station to select the first PMI, an example is described below, which is merely an example and is not intended to limit the present invention. Specifically, referring to FIG. 4, the method includes the following steps:

Step 3031: Perform channel estimation on the uplink data to obtain a channel response set on scheduled bandwidth.

In an example, the channel estimation may be performed on the uplink data by using a DMRS (demodulation reference signal).

The channel response set contains several channel matrices H, for example, $H_1$, $H_2$, $H_3$, . . . , and $H_m$, where m indicates the number of channel matrices and is a positive integer, and each channel matrix corresponds to one RB (resource block). Each channel matrix reflects channel state information on each RB.

Step 3032: Perform data processing on each PMI in the PMI set of the base station and each channel matrix in the channel response set according to an optimal system performance goal criterion to obtain metric values, where a PMI corresponding to a maximum metric value is the selected first PMI.

For example, the PMI set is a PMI set defined in 3GPP TS 36.211 (The 3rd Generation Partnership Project Technical Specification 36.211).

The optimal system performance goal criterion includes: a received-signal power maximization criterion, a system throughout maximization criterion, or the like.

In this embodiment, a detailed description is given by using the received-signal power maximization criterion as an example.

The PMI set contains n PMIs: $PMI_1$, $PMI_2$, $PMI_3$, . . . , and $PMI_n$, where n is a positive integer.

According to the received-signal power maximization criterion, the data processing is performed on the PMI set and the channel response set as follows:

$|PMI_1 \times H_1| + |PMI_1 \times H_2| + |PMI_1 \times H_3| + \ldots + |PMI_1 \times H_m| = S_1;$ $|PMI_2 \times H_1| + |PMI_2 \times H_2| + |PMI_2 \times H_3| + \ldots + |PMI_2 \times H_m| = S_2;$ $|PMI_3 \times H_1| + |PMI_3 \times H_2| + |PMI_3 \times H_3| + \ldots + |PMI_3 \times H_m| = S_3;$ $|PMI_n \times H_1| + |PMI_n \times H_2| + |PMI_n \times H_3| + \ldots + |PMI_n \times H_m| = S_i.$ Each PMI in the PMI set is multiplied by each channel matrix in the channel response set to obtain metric value matrices, modulus values of the metric value matrices are calculated, and the modulus values are added up to obtain a metric value corresponding to each PMI.

The $S_1$, $S_2$, $S_3$, . . . , and $S_i$ are respectively a metric value 1, a metric value 2, a metric value 3, . . . , and a metric value i. A comparison is made among the obtained metric values and the PMI corresponding to the maximum metric value is the selected first PMI.

Figure 5:
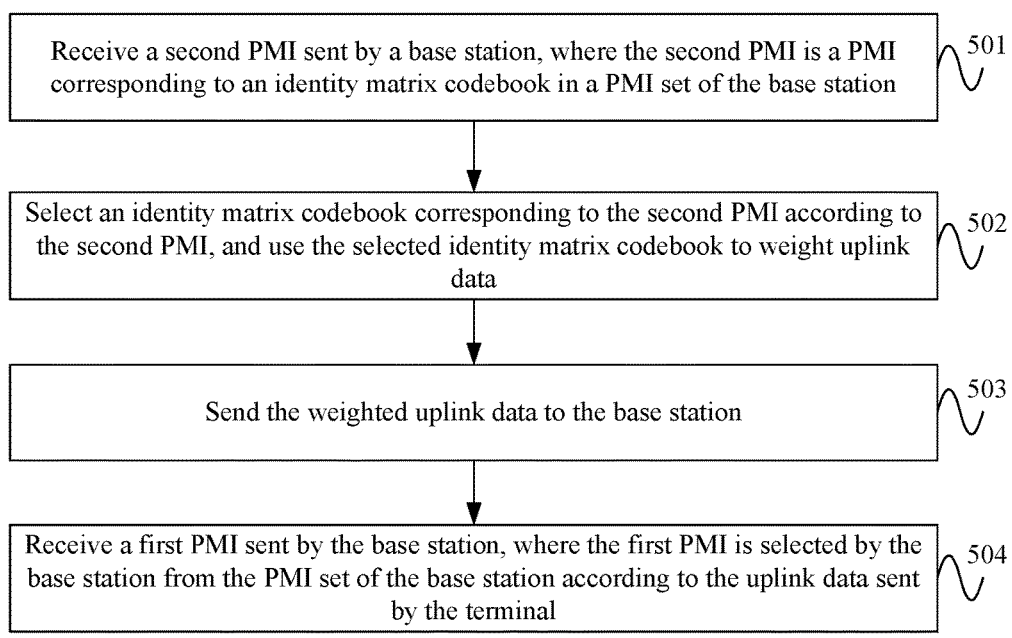
FIG. 5 is a flowchart of a method for selecting a PMI according to another embodiment of the present invention.

Corresponding to the method shown in FIG. 3, as shown in FIG. 5, a method for selecting a PMI according to another embodiment of the present invention involves a terminal side and includes the following steps:

Step 501: Receive a second PMI sent by a base station, where the second PMI is a PMI corresponding to an identity matrix codebook (simply referred to as an identity codebook) in a PMI set of the base station.

In this embodiment, indication information is a PMI, that is, the second PMI.

As is described for the indication information in the foregoing embodiment, the second PMI is sent by the base station periodically or non-periodically. When the second PMI is sent non-periodically, the second PMI may be sent at time of a demodulation reference signal, that is, a DMRS moment. When the second PMI is sent periodically, a sending period of the second PMI may be shorter than a sending period of a sounding signal.

Step 502: Select an identity matrix codebook corresponding to the second PMI according to the second PMI, and use the selected identity matrix codebook to weight uplink data. For example, if a matrix of a channel is H, the identity matrix codebook selected by the terminal according to the second PMI is I, and to-be-sent uplink data is X, then uplink data Y sent after being weighted is as follows:

$Y=I*H*X.$

Step 503: Send the weighted uplink data to the base station.

Step 504: Receive a first PMI sent by the base station, where the first PMI is selected by the base station from the PMI set of the base station according to the uplink data sent by the terminal.

Thereby, the terminal can send the uplink data after weighting the uplink data by using the first PMI selected by the base station.

Figure 4:
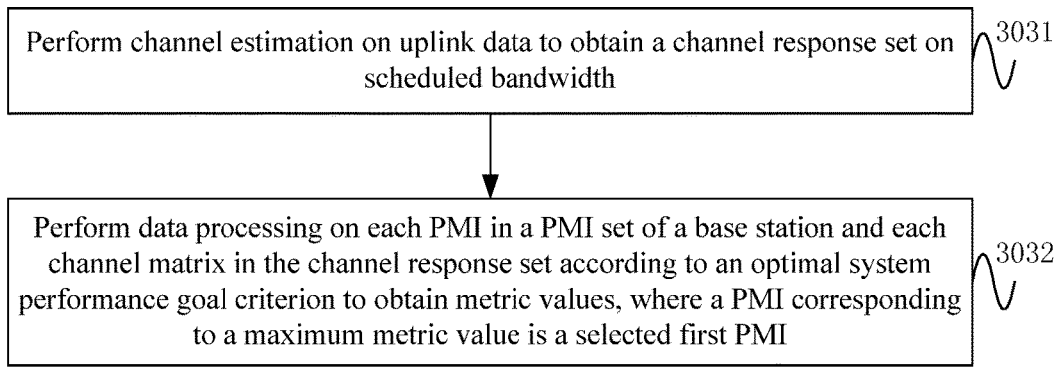
FIG. 4 is a flowchart of a method for selecting a PMI according to an embodiment of the present invention.

The first PMI is selected in the same manner as exemplified in FIG. 4, which is not repeated herein.

To make a person skilled in the art understand the technical solutions in the embodiments of the present invention more clearly, the following describes the method for selecting a PMI according to the embodiments of the present invention in detail by using a specific embodiment.

Figure 6:
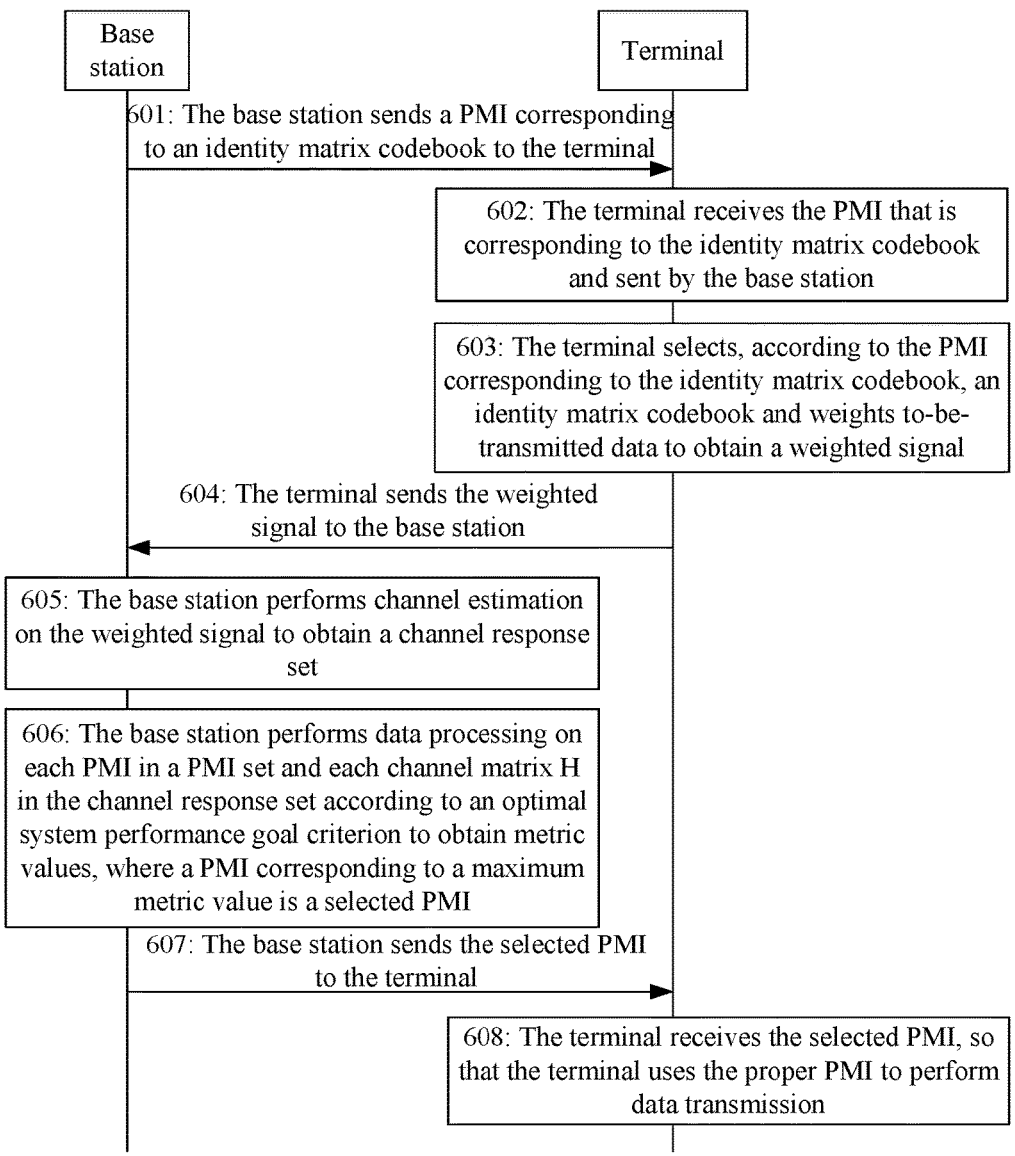
FIG. 6 is a signaling diagram of a method for selecting a PMI according to still another embodiment of the present invention.

As shown in FIG. 6, a method for selecting a PMI according to still another embodiment of the present invention includes the following steps:

Step 601: A base station sends a PMI corresponding to an identity matrix codebook to a terminal.

The PMI is a PMI corresponding to an identity matrix codebook in a PMI set of the base station. The base station may send the PMI periodically, or may send the PMI non-periodically.

In addition, the PMI corresponding to the identity matrix codebook may be sent by using a PDCCH.

Step 602: The terminal receives the PMI that is corresponding to the identity matrix codebook and sent by the base station.

Step 603: The terminal selects, according to the PMI corresponding to the identity matrix codebook, an identity matrix codebook and weights to-be-transmitted data to obtain a weighted signal.

Step 604: The terminal sends the weighted signal to the base station.

Step 605: The base station performs channel estimation on the weighted signal to obtain a channel response set.

Specifically, the channel estimation is performed on the weighted signal by using a DMRS (demodulation reference signal).

Specifically, assume that the channel response set includes 4 channel matrices H, namely, $H_1$, $H_2$, $H_3$, and $H_4$, and that each channel matrix H corresponds to one RB.

Each channel matrix H indicates channel state information on each RB.

Step 606: The base station performs data processing on each PMI in the PMI set and each channel matrix H in the channel response set according to an optimal system performance goal criterion to obtain metric values, where a PMI corresponding to a maximum metric value is a selected PMI.

The PMI set in this embodiment of the present invention is a PMI set defined in 3GPP TS 36.211 (The 3rd Generation Partnership Project Technical Specification 36.211).

The optimal system performance goal criterion includes: a received-signal power maximization criterion, a system throughout maximization criterion, or the like.

In this embodiment, a detailed description is given by using the received-signal power maximization criterion as an example:

Assume that the PMI set includes 4 PMIs: $PMI_1$, $PMI_2$, $PMI_3$, and $PMI_4$.

The data processing is performed on the PMI set and the channel response set according to the received-signal power maximization criterion, which is specifically as follows:

$|PMI_1 \times H_1|+|PMI_1 \times H_2|+|PMI_1 \times H_3|+|PMI_1 \times H_4|=S_1;$ $|PMI_2 \times H_1|+|PMI_2 \times H_2|+|PMI_2 \times H_3|+|PMI_2 \times H_4|=S_2;$ $|PMI_3 \times H_1|+|PMI_3 \times H_2|+|PMI_3 \times H_3|+|PMI_3 \times H_4|=S_3;$ $|PMI_4 \times H_1|+|PMI_4 \times H_2|+|PMI_4 \times H_3|+|PMI_4 \times H_4|=S_4.$ Each PMI in the PMI set is multiplied by each channel matrix H in the channel response set to obtain metric value matrices, modulus values of the metric value matrices are calculated, and the modulus values are added up to obtain a metric value corresponding to each PMI.

The $S_1$, $S_2$, $S_3$, and $S_4$ are respectively a metric value 1, a metric value 2, a metric value 3, and a metric value 4. A comparison is made among the obtained metric values. Assuming that the maximum metric value is $S_3$, $PMI_3$ corresponding to $S_3$ is the selected PMI.

Step 607: The base station sends the selected PMI to the terminal.

Step 608: The terminal receives the selected PMI, so that the terminal uses the proper PMI to perform data transmission.

It can been seen that, in the method for selecting a PMI according to this embodiment, a base station sends indication information to a terminal; the terminal sends, according to the indication information, uplink data without weighting the uplink data or after weighting the uplink data by using an identity matrix; the base station selects a first PMI from a PMI set of the base station according to the received uplink data and delivers the first PMI to the terminal; the terminal uses the first PMI to perform data transmission. Compared with the prior art, the base station can initiate PMI selection actively when needed, without relying on a sounding signal sent by the terminal, so as to improve accuracy of the PMI selection and further increase performance gain of SU-MIMO.

Figure 7:
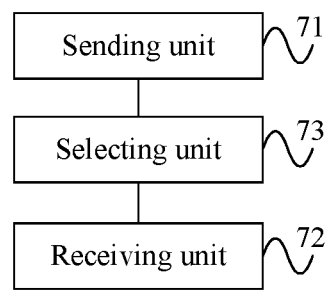
FIG. 7 is a structural diagram of a base station according to an embodiment of the present invention.

Corresponding to the foregoing method, as shown in FIG. 7, the present invention further provides a base station, including:

a sending unit 71, configured to send indication information to a terminal, where: the indication information is used to instruct the terminal to send uplink data without weighting the uplink data or after weighting the uplink data by using an identity matrix; and the sending unit 71 is specifically configured to send the indication information to the terminal periodically or non-periodically; for example, in a case in which the indication information is sent non-periodically, the indication information may be sent to the terminal at time of a demodulation reference signal; for another example, in a case in which the indication information is sent periodically, a sending period of the indication information is shorter than a period for the terminal to send a sounding signal to the base station, where the sending period of the sounding signal is generally set by the base station;

a receiving unit 72, configured to receive the uplink data sent by the terminal; and a selecting unit 73, configured to select a first PMI from a pre-coding matrix indication (PMI) set of the base station according to the uplink data received by the receiving unit.

The sending unit 71 is further configured to send the first PMI selected by the selecting unit 73 to the terminal.

Specifically, the indication information sent by the sending unit 71 is a second PMI, where the second PMI is a PMI corresponding to an identity matrix codebook in the PMI set of the base station; the uplink data received by the receiving unit 72 is uplink data weighted according to an identity matrix codebook corresponding to the second PMI and sent by the terminal.

It can been seen that, in this embodiment, a base station sends indication information to a terminal; the terminal sends, according to the indication information, uplink data to the base station without weighting the uplink data or after weighting the uplink data by using an identity matrix; the base station selects a first PMI from a PMI set of the base station according to the received uplink data and delivers the first PMI to the terminal; the terminal uses the first PMI to perform data transmission. Compared with the prior art, the base station can initiate PMI selection actively when needed, without relying on a sounding signal sent by the terminal, so as to improve accuracy of the PMI selection and further increase performance gain of SU-MIMO.

It should be noted that the receiving unit 72 may be a receiver of the base station, the sending unit 71 may be a transmitter of the base station; in addition, the receiving unit 72 and the sending unit 71 may be integrated to form a transceiver of the base station. The selecting unit 73 may be a standalone processor, or may be integrated to a certain processor of the base station for implementation. In addition, the selecting unit 73 may also be stored in a memory of the base station in a form of program code, and invoked by a certain processor of the base station to execute a function of the selecting unit. The processor described herein may be a central processing unit (CPU), or may be an application specific integrated circuit (ASIC), or may be disposed on one or more integrated circuits that implement this embodiment of the present invention.

Figure 8:
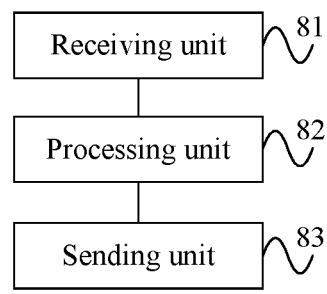
FIG. 8 is a structural diagram of a terminal according to an embodiment of the present invention.

An embodiment of the present invention further provides a terminal. As shown in FIG. 8, the terminal includes:

a receiving unit 81, configured to receive indication information sent by a base station, where the base station may send the indication information periodically or non-periodically; for example, the indication information received by the receiving unit 81 may be sent by the base station at time of a demodulation reference signal; for another example, a sending period of the indication information is shorter than a sending period of a sounding signal of the terminal;

a processing unit 82, configured to obtain, according to the indication information received by the receiving unit 81, unweighted uplink data or uplink data weighted by using an identity matrix; and a sending unit 83, configured to send the uplink data obtained by the processing unit 82 to the base station.

The receiving unit 81 is further configured to receive a first PMI sent by the base station, where the first PMI is selected by the base station from a PMI set of the base station according to the uplink data sent by the sending unit 83.

The indication information received by the receiving unit 81 is a second PMI, where the second PMI is a PMI corresponding to an identity matrix codebook in the PMI set of the base station; the processing unit 82 is specifically configured to select an identity matrix codebook corresponding to the second PMI according to the second PMI, and use the identity matrix codebook corresponding to the second PMI to weight uplink data to obtain the uplink data weighted by using the identity matrix.

It should be noted that the receiving unit 81 may be a receiver of the terminal, and the sending unit 83 may be a transmitter of the terminal; in addition, the receiving unit 81 and the sending unit 83 may be integrated to form a transceiver of the terminal. The processing unit 82 may be a standalone processor, or may be integrated in a certain processor of the terminal for implementation. In addition, the processing unit 82 may also be stored in a memory of the terminal in a form of program code, and invoked by a certain processor of the terminal to perform a function of the processing unit. The processor described herein may be a central processing unit (CPU), or may be an application specific integrated circuit (ASIC), or may be configured to one or more integrated circuits that implement this embodiment of the present invention.

For the terminal according to another embodiment of the present invention, a base station sends indication information to the terminal; the terminal sends, according to the indication information, uplink data to the base station after weighting the uplink data by using an identity matrix or without weighting the uplink data; the base station selects a first PMI from a PMI set of the base station according to the received uplink data and delivers the first PMI to the terminal; the terminal uses the first PMI to perform data transmission. Compared with the prior art, the base station can initiate PMI selection actively when needed, without relying on a sounding signal sent by the terminal, so as to improve accuracy of the PMI selection and further increase performance gain of SU-MIMO.

Figure 9:
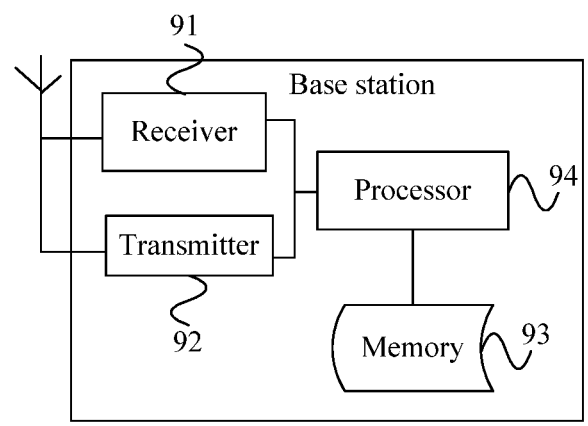
FIG. 9 is a structural diagram of a base station according to another embodiment of the present invention.

As shown in FIG. 9, which is a schematic structural diagram of another embodiment of a base station according to the present invention, the base station includes a receiver 91, a transmitter 92, a memory 93 and a processor 94. The receiver 91, the transmitter 92 and the memory 94 are all connected to the processor 94, for example, they can be connected to the processor 94 by using a bus. Certainly, the base station may also include common parts such as an antenna, a baseband processing part, an intermediate radio frequency processing part and an input/output apparatus, which are not limited by this embodiment of the present invention hereby.

The receiver 91 and the transmitter 92 may be integrated to form a transceiver.

The memory 93 is configured to store executable program code, where the program code includes a computer operation instruction, and the memory 93 may also store a PMI set of the base station and a matrix codebook corresponding to each PMI in the PMI set. The memory 93 may include a high-speed RAM memory, and may also include a non-volatile memory, for example, at least one disk memory.

The processor 94 may be a central processing unit (CPU), or may be an application specific integrated circuit (ASIC), or may be disposed on one or more integrated circuits that implement this embodiment of the present invention.

The receiver 91 is configured to receive uplink data sent by a terminal.

The transmitter 92 is configured to send indication information to the terminal, where the indication information is used to instruct the terminal to send the uplink data without weighting the uplink data or after weighting the uplink data by using an identity matrix.

The processor 94 is configured to select a first PMI from the PMI set of the base station according to the uplink data received by the receiver 91. The first PMI is sent to the terminal by the transmitter 92.

It can been seen that the base station according to this embodiment sends indication information to a terminal; the terminal sends, according to the indication information, uplink data to the base station without weighting the uplink data or after weighting the uplink data by using an identity matrix; the base station selects a first PMI from a PMI set of the base station according to the received uplink data and delivers the first PMI to the terminal; the terminal uses the first PMI to perform data transmission. Compared with the prior art, the base station can initiate PMI selection actively when needed, without relying on a sounding signal sent by the terminal, so as to improve accuracy of the PMI selection and further increase performance gain of SU-MIMO.

Figure 10:
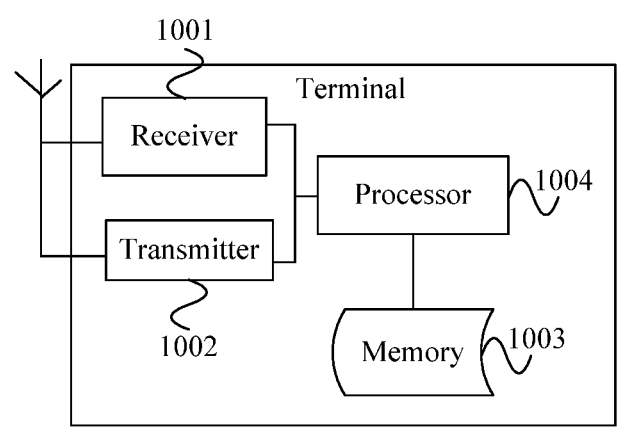
FIG. 10 is a structural diagram of a terminal according to another embodiment of the present invention.

As shown in FIG. 10, which is a schematic structural diagram of another embodiment of a terminal according to the present invention, the terminal includes a receiver 1001, a transmitter 1002, a memory 1003 and a processor 1004. The receiver 1001, the transmitter 1002 and the memory 1003 are all connected to the processor 1004, for example, they can be connected to the processor 1004 by using a bus. Certainly, the terminal may also include common parts such as an antenna, a baseband processing part, an intermediate radio frequency processing part and an input/output apparatus, which are not limited by this embodiment of the present invention hereby.

The receiver 1001 and the transmitter 1002 may be integrated to form a transceiver.

The memory 1003 is configured to store executable program code and to-be-sent uplink data, where the program code includes a computer operation instruction, and the memory 1003 is also configured to store a PMI set of the terminal and a matrix codebook corresponding to each PMI in the PMI set, where the PMI set is consistent with a PMI set of a base station. The memory 1003 may include a high-speed RAM memory, and may also include a non-volatile memory, for example, at least one disk memory.

The processor 1004 may be a central processing unit (CPU), or may be an application specific integrated circuit (ASIC), or may be disposed on one or more integrated circuits that implement this embodiment of the present invention.

The receiver 1001 is configured to receive indication information sent by the base station. The indication information is used to instruct the terminal to send uplink data without weighting the uplink data or after weighting the uplink data by using an identity matrix. The receiver 1001 is also configured to receive a first PMI sent by the base station, where the first PMI is selected by the base station from the PMI set of the base station.

The processor 1004 is configured to perform, according to the indication information received by the receiver 1001, data processing on the to-be-sent uplink data to obtain unweighted uplink data or uplink data weighted by using the identity matrix. The unweighted uplink data or the uplink data weighted by using the identity matrix is sent to the base station by the transmitter 1002.

It can been seen that the terminal according to this embodiment receives indication information sent by a base station; the terminal sends, according to the indication information, uplink data to the base station without weighting the uplink data or after weighting the uplink data by using an identity matrix; the base station selects a first PMI from a PMI set of the base station according to the received uplink data and delivers the first PMI to the terminal; the terminal uses the first PMI to perform data transmission. Compared with the prior art, the base station can initiate PMI selection actively when needed, without relying on a sounding signal sent by the terminal, so as to improve accuracy of the PMI selection and further increase performance gain of SU-MIMO.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A method for selecting a pre-coding matrix indication (PMI), the method comprising:
    sending, by a base station, indication information to a terminal, wherein the indication information is used to instruct the terminal to send uplink data without weighting the uplink data or after weighting the uplink data by using an identity matrix;
    receiving, by the base station, the uplink data sent by the terminal;
    selecting, by the base station, a first PMI from a PMI set of the base station according to the uplink data; and
    sending the first PMI to the terminal,
    wherein the indication information is a second PMI, wherein the second PMI is a PMI corresponding to an identity matrix codebook in the PMI set of the base station, and wherein the uplink data is uplink data that is weighted according to an identity matrix codebook corresponding to the second PMI and sent by the terminal.

2. The method according to claim 1, wherein sending the indication information to the terminal comprises sending the indication information to the terminal non-periodically.

3. The method according to claim 2, wherein sending the indication information to the terminal non-periodically comprises sending the indication information to the terminal at time of a demodulation reference signal.

4. The method according to claim 1, wherein sending the indication information to the terminal comprises sending the indication information to the terminal periodically, wherein a sending period of the indication information is shorter than a sending period of a sounding signal of the terminal.

5. A method for selecting a pre-coding matrix indication (PMI), the method comprising:
    receiving, by a terminal, indication information sent by a base station;
    sending, by the terminal, according to the indication information, unweighted uplink data or uplink data weighted by using an identity matrix to the base station; and
    receiving a first PMI sent by the base station, wherein the first PMI is selected by the base station from a PMI set of the base station according to the uplink data sent by the terminal, wherein the indication information is a second PMI, wherein the second PMI is a PMI corresponding to an identity matrix codebook in the PMI set of the base station, and wherein sending, according to the indication information, unweighted uplink data or uplink data weighted by using an identity matrix to the base station comprises:
        selecting an identity matrix codebook corresponding to the second PMI, wherein using the identity matrix codebook corresponding to the second PMI to weight uplink data; and
        sending the weighted uplink data to the base station.

6. The method according to claim 5, wherein the indication information is sent by the base station at time of a demodulation reference signal.

7. The method according to claim 5, wherein the indication information is sent by the base station periodically, and a sending period of the indication information is shorter than a sending period of a sounding signal of the terminal.

8. A base station comprising:
a transmitter configured to send indication information to a terminal, wherein the indication information is used to instruct the terminal to send uplink data without weighting the uplink data or after weighting the uplink data by using an identity matrix;
a receiver configured to receive the uplink data sent by the terminal; and
a processor configured to select a first pre-coding matrix indication (PMI) from a PMI set of the base station according to the uplink data received by the receiver, wherein the transmitter is further configured to send the first PMI selected by the processor to the terminal, wherein the indication information sent by the transmitter is a second PMI, wherein the second PMI is a PMI corresponding to an identity matrix codebook in the PMI set of the base station, and wherein the uplink data received by the receiver is uplink data that is weighted according to an identity matrix codebook corresponding to the second PMI and sent by the terminal.

9. The base station according to claim 8, wherein the transmitter is configured to send the indication information to the terminal non-periodically.

10. The base station according to claim 9, wherein the transmitter is configured to send the indication information to the terminal at a time of a demodulation reference signal.

11. The base station according to claim 8, wherein the transmitter is configured to send the indication information to the terminal periodically.

12. The base station according to claim 11, wherein a sending period of the indication information is shorter than a sending period of a sounding signal of the terminal.

13. A terminal comprising:
a receiver configured to receive indication information sent by a base station;
a processor configured to obtain, according to the indication information received by the receiver, unweighted uplink data or uplink data weighted by using an identity matrix; and
a transmitter configured to send the uplink data obtained by the processor to the base station, wherein the receiver is further configured to receive a first pre-coding matrix indication (PMI) sent by the base station, wherein the first PMI is selected by the base station from a PMI set of the base station according to the uplink data sent by the transmitter, wherein the indication information received by the receiver is a second PMI, wherein the second PMI is a PMI corresponding to an identity matrix codebook in the PMI set of the base station, and wherein the processor is configured to:
select an identity matrix codebook corresponding to the second PMI; and
use the identity matrix codebook corresponding to the second PMI to weight uplink data and obtain the uplink data weighted by using the identity matrix.

14. The terminal according to claim 13, wherein the indication information is sent by the base station at a time of a demodulation reference signal.

15. The terminal according to claim 13, wherein the indication information is sent by the base station periodically.

16. The terminal according to claim 15, wherein a sending period of the indication information is shorter than a sending period of a sounding signal of the terminal.

* * * * *